(12) United States Patent
Larmour

(10) Patent No.: US 10,107,622 B2
(45) Date of Patent: Oct. 23, 2018

(54) GO KART STEERING MEASUREMENT TOOL

(71) Applicant: Larmour Consulting GmbH, Munich (DE)

(72) Inventor: Chris Larmour, Munich (DE)

(73) Assignee: Larmour Consulting GmbH, Munich (DE)

( * ) Notice: Subject to any disclaimer, the term of this patent is extended or adjusted under 35 U.S.C. 154(b) by 11 days.

(21) Appl. No.: 14/997,095

(22) Filed: Jan. 15, 2016

(65) Prior Publication Data

US 2016/0258745 A1  Sep. 8, 2016

(30) Foreign Application Priority Data

Jan. 15, 2015  (DE) .................. 10 2015 100 597

(51) Int. Cl.
*G01B 11/26* (2006.01)
*G01B 11/275* (2006.01)
*G01M 17/06* (2006.01)
(Continued)

(52) U.S. Cl.
CPC ............ *G01B 11/26* (2013.01); *G01B 11/275* (2013.01); *G01M 17/06* (2013.01); *B62D 17/00* (2013.01); *G01B 2210/30* (2013.01)

(58) Field of Classification Search
CPC ...................... G01B 21/26; G01B 11/2755; G01B 2210/26; G01B 2210/28; G01B 5/255;
(Continued)

(56) References Cited

U.S. PATENT DOCUMENTS 3,234,656 A * 2/1966 MacMillan .............. G01B 3/56
33/203
4,143,970 A  3/1979 Lill
(Continued)

FOREIGN PATENT DOCUMENTS

CA  2485543  7/2005
DE  1907584  12/1964

OTHER PUBLICATIONS

Extended EP Search Report dated May 20, 2016.
Sniper Precision Technologies: Owner's Guide—Model V4, Firmenschrift, 2009.

*Primary Examiner* — Yaritza Guadalupe-McCall
(74) *Attorney, Agent, or Firm* — O'Shea Getz P.C.

(57) ABSTRACT

A go kart steering measurement tool for measuring at least one of a caster angle and a king pin angle of a front wheel steering mechanism of a go kart includes a tool body, and an axle engagement structure adapted to position the go kart steering measurement tool on an axle of the go kart, wherein the tool body has a target surface for making an impinging laser beam from a separate laser emission tool visible to a user of the go kart steering measurement tool, wherein the target surface has a first scale, including a plurality of first markings, and a second scale, including a plurality of second markings, with the first scale and the second scale having the same scaling, and wherein the first scale and the second scale are spaced apart, such that, upon the separate laser emission tool being attached to the front wheel steering mechanism and the front wheel steering mechanism being turned and the impinging laser beam moving across the target surface as a result thereof, a first measurement on the first scale and a second measurement on the second scale can be made by visual inspection, with a difference between the first measurement and the second measurement being an (Continued)

indication of the caster angle or of the king pin angle of a steerable stub axle of the go kart.

21 Claims, 9 Drawing Sheets

(51) Int. Cl.
*B62D 17/00* (2006.01)

(58) Field of Classification Search
CPC ............ G01B 11/275; G01B 2210/143; G01B 2210/30; G01M 17/007; G01M 17/04; G01M 17/06
USPC .................................. 33/228, 288, DIG. 21
See application file for complete search history.

(56) References Cited

U.S. PATENT DOCUMENTS

| | | | |
|---|---|---|---|
| 4,338,027 A | | 7/1982 | Eck |
| 4,823,470 A | | 4/1989 | Horvallius |
| 4,827,623 A | * | 5/1989 | Goodell ............... G01B 11/275 33/203.18 |
| 4,918,821 A | * | 4/1990 | Bjork ................... G01B 11/275 33/203.18 |
| 4,970,801 A | * | 11/1990 | Specktor ................ B62D 17/00 33/600 |
| 5,014,227 A | | 5/1991 | Kling et al. |
| 5,168,632 A | * | 12/1992 | Rimlinger, Jr. ......... G01B 5/255 33/203.18 |
| 6,105,264 A | * | 8/2000 | Phillips ................. G01B 5/0002 33/288 |
| 6,772,524 B2 | * | 8/2004 | Machek ............... G01B 11/272 33/203.18 |
| 2005/0115088 A1 | * | 6/2005 | Paulsen ................. G01B 5/255 33/203.18 |
| 2013/0110314 A1 | | 5/2013 | Stieff |
| 2016/0209210 A1 | * | 7/2016 | Larmour ............... G01B 11/275 |
| 2016/0258745 A1 | * | 9/2016 | Larmour ............... G01B 11/275 |

* cited by examiner

GO KART STEERING MEASUREMENT TOOL

This application claims priority to German Patent Appln. No. 10 2015 100 597.2 filed Jan. 15, 2015, which is hereby incorporated by reference.

BACKGROUND OF THE INVENTION

1. Technical Field

The present invention is in the field of go karts. In particular, the present invention relates to tools used during the checking and setting up of the go kart, i.e. to tools used during the maintenance of the go kart and during the adaptation of the go kart to a particular race track. Further in particular, the present invention relates to tools relying on optical measurements.

2. Background Information

Go karts are a very basic kind of race cars. They are mainly used for recreational racing purposes. Also, go karts are used by children and adolescents who wish to enter the field of car racing. In particular, go karts are viewed as a stepping stone for developing driving skills before moving on to professional car racing classes like Formula 3®, GP 2®, and Formula 1®.

Typical go karts have a chassis, which forms the base of the go kart. In particular, the chassis forms the support for the other components of the go kart, such as the driver's seat, the engine, the steering mechanism, the wheels, the bumper frame, aerodynamic structures, etc. The correct alignment of the chassis is an important factor for a good driving behaviour of the go kart. If the chassis is bent or twisted, this can quickly lead to undesired driving characteristics of the go kart.

The driving characteristics of the go kart are further heavily influenced by the set up of the steering mechanism of the go kart. The user of the go kart has various degrees of freedom to set up the steering mechanism. The four most commonly used adjustment options are camber, toe in/out, caster, and king pin angle. Camber refers to the inclination of the front wheels with respect to their vertical orientation. Toe in/out refers to the degree of deviation of the wheel orientation from the longitudinal extension of the go kart. The wheels pointing towards the inside is referred to as toe in, whereas the wheels pointing towards the outside is referred to as toe out. In other words, toe in and toe out refer to the deviation of the rolling direction of a front wheel from the straight rolling direction, if the wheel were to roll unrestrained by the go kart. Caster refers to the rotation of the front wheel axis, to which the front wheel is mounted, and its point of suspension. In case the front wheel axis is suspended by a king pin, caster refers to the inclination of the king pin towards the front or back. While caster does not have an impact on the go kart during straight driving, it provides for a relative lifting or lowering of the wheel, when the steering is turned. This results in desired shifts in weight and force absorptions during cornering of the go kart. The inclination of the king pin towards the left or right, i.e. the inclination with respect to the imaginary connection line between the front axles of the go kart, is referred to as the king pin angle. While the camber of the steering mechanism may be affected by the king pin angle, it is possible that the king pin angle is zero and that camber is achieved in a different manner. In other words, there is not necessarily a direct relation between the king pin angle and the camber value.

As the chassis alignment and the steering mechanism set up play an important role in achieving good driving characteristics of the go kart, with the optimum being different from track to track depending on the layout, grip level, etc., a variety of tools for checking the chassis alignment and gauging the steering mechanism are in use. In recent years, optical measurement devices, often relying on laser technology, have become common place. However, available tools are still not fully satisfactory.

In particular, the available tools for measurement of the caster angle and/or the king pin angle are still very cumbersome to use. They require multiple steps of operation and do not allow for quick measurements.

Accordingly, it would be beneficial to provide an improved go kart steering measurement tool that allows for a particularly quick measurement of the caster angle and/or the king ping angle of the steering mechanism and is easy to use.

SUMMARY OF THE DISCLOSURE

Exemplary embodiments of the invention include a go kart steering measurement tool for measuring at least one of a caster angle and a king pin angle of a front wheel steering mechanism of a go kart, comprising a tool body, and an axle engagement structure adapted to position the go kart steering measurement tool on an axle of the go kart. The tool body has a target surface for making an impinging laser beam from a separate laser emission tool visible to a user of the go kart steering measurement tool. The target surface comprises a first scale, comprising a plurality of first markings, and a second scale, comprising a plurality of second markings, with the first scale and the second scale having the same scaling. The first scale and the second scale are spaced apart, such that, upon the separate laser emission tool being attached to the front wheel steering mechanism and the front wheel steering mechanism being turned and the impinging laser beam moving across the target surface as a result thereof, a first measurement on the first scale and a second measurement on the second scale can be made by visual inspection, with a difference between the first measurement and the second measurement being an indication of the caster angle or of the king pin angle of a steerable stub axle of the go kart.

The provision of two spaced scales with the same scaling allows for differential measurements that allow for the determination of the caster angle and/or of the king pin angle with sufficient accuracy without additional efforts for having a datum reference point or exact positioning. As compared to prior art approaches, where the separate laser emission tool had to be aimed at a specific calibration point before a caster angle measurement was carried out, the differential nature of the measurement eliminates the need for prior calibration and/or prior exact alignment of the go kart steering measurement tool and the separate laser emission tool. Deviations from a perfect measurement scenario equally or similarly affect the first and second measurements, such that the differential measurement allows for a determination of the caster angle and/or the king pin angle with sufficient accuracy. The caster angle/king pin angle measurement is independent from the concrete first and second measurements on the first and second scales, as only the difference between the first and second measurements is being used as an indication of the caster angle/king pin angle. Also, the differential nature of the measurement reduces the sensitivity to the exact positioning of the separate laser emission tool.

Sufficiently reliable results can be achieved with the go kart steering measurement tool and the separate laser emission tool being in different places and having different orientations. For example, with the go kart steering measurement tool being placed on the right front stub axle of the go kart and the separate laser emission tool being placed on the left front stub axle of the go kart, or vice versa, reliable caster angle measurements may be made irrespective of the camber and toe in/toe out set up of the steering mechanism. In this way, a highly convenient and quick way of measuring the caster angle is made possible. Reliable king pin angle measurements may be carried out with the go kart steering measurement tool having a fixed position with respect to the go kart chassis and with the separate laser emission tool being placed on a steerable front stub axle. For example, the separate laser emission tool may be placed on the right (left) front stub axle of the go kart and the go kart steering measurement tool may be placed on the right (left) side of the rear axle of the go kart or another fixed structure in the right (left) rear region of the go kart, which allows for a measurement of the king pin angle of the right (left) front stub axle.

The rear axle of the go kart may be a single rear axle having first and second side portions on opposing sides of the go kart. In case the axle engagement structure allows for the go kart steering measurement tool to be positioned on the rear axle, the axle engagement structure may allow for the go kart steering measurement tool to be positioned on any of the first and second side portions of the rear axle. It is also possible that the rear axle of the go kart has a left rear axle section and a right rear axle section and that the right and left rear axle sections can rotate at different rotating speeds. In other words, the rear axle of the go kart may consist of a first rear axle and a second rear axle on opposing sides of the go kart. In that case, the axle engagement structure may allow for the go kart steering measurement tool to be positioned on any one of the left and right rear axle sections.

The expression of the steering mechanism being turned refers to the steering mechanism being operated from left to right or vice versa. In other words, it refers to the steerable stub axle of the go kart being rotated from forward to backward or vice versa with respect to its suspension point, such as with respect to the king pin. This turning of the steering mechanism may be effected via a turning of the steering wheel of the go kart or via manual or other movement of any portion of the steering mechanism between the steering wheel and the steerable stub axle.

With the separate laser emission tool being attached to the front wheel steering mechanism, the front wheel steering mechanism being turned results in the laser emission direction of the separate laser emission tool changing together with the front wheel steering mechanism turning. Due to the distance between the separate laser emission tool and the go kart steering measurement tool, this changing of the laser emission direction results in the impinging laser beam travelling across the entire width of the target surface for small changes in the front wheel steering mechanism. Due to this amplification of the motion of the laser beam, the measurements may be carried out conveniently. According to an embodiment, the separate laser emission tool may be attached to one of the right steerable front stub axle and the left steerable front stub axle of the go kart.

The expression scale refers to an arrangement of the respective plurality of markings that allows for the user of the go kart steering measurement tool to make different readings, depending on where the laser beam from the separate laser emission tool hits the target surface in the particular measurement operation. The expression scaling refers to the underlying meaning of the respective plurality of markings, i.e. to the convention what values the plurality of markings mean. The first and second caster scale having the same scaling means that the underlying theory of the two scales are the same, but does not necessarily require all markings to be identical. For example, both the first and second scales may directly relate to the measured angle in degrees, but one scale may have one marking per every degree, while the other scale may have one marking per every two degrees. While having different step widths in this example, the first and second scales still have the same scaling, because they rely on the same scaling principle. The scaling may be configured with different underlying assumptions. For example, the scaling may be based on the assumption that the separate laser emission tool is placed on the other steerable stub axle and is moved during the turning of the steering mechanism in an opposite manner.

When the first and second scales are intended for caster angle measurements, they may also be referred to as first and second caster scales. Analogously, when the first and second scales are intended for king pin angle measurements, they may also be referred to as first and second king pin angle scales.

According to a further embodiment, the axle engagement structure is adapted to position the go kart steering measurement tool on any one of a right steerable front stub axle and a left steerable front stub axle of the go kart, with the target surface facing towards the other one of the right steerable front stub axle and the left steerable front stub axle of the go kart, such that, upon the separate laser emission tool being positioned on the other one of the right steerable front stub axle and the left steerable front stub axle of the go kart and upon the steering mechanism being turned and the impinging laser beam moving across the target surface as a result thereof, the difference between the first measurement and the second measurement is an indication of the caster angle of the one of the right steerable front stub axle and the left steerable front stub axle, onto which the go kart steering measurement tool is positioned. In other words, the axle engagement structure has a configuration that allows for the go kart steering measurement tool to be placed onto any one of the right and left front stub axles of the go kart, and the axle engagement structure and the target surface have such a relative positioning on the tool body that the positioning of the go kart steering measurement tool on the one of the right and left front stub axles of the go kart via the axle engagement structure results in the target surface facing towards the other one of the right and left front stub axles of the go kart. The target surface is thus able to make an impinging laser beam visible that originates from somewhere in the direction of the other one of the right and left front stub axles. In particular, the target surface may be positioned in a plane that is orthogonal to the one of the right and left front stub axles.

A caster angle measurement operation is described for the example of the go kart steering measurement tool being placed on the steerable right front stub axle of the go kart and the separate laser emission tool being placed on the steerable left front stub axle and emitting the laser beam towards the right front stub axle. The go kart steering measurement tool may be placed upright on the right front stub axle, when the steering mechanism is oriented straight. It is also possible that the go kart steering measurement tool is placed in an inclined position with respect to the right front stub axle, when the steering mechanism is oriented straight. Due to the rotation of the right front stub axle and its point of suspension, referred to as caster, a turning of the front wheel steering mechanism results in an inclination of the originally upright go kart steering measurement tool towards the front and back or in a change in inclination of the originally inclined go kart steering measurement tool towards the front and back. This inclination is made visual by the impinging laser beam, when travelling across the target surface from left to right (or right to left) and changing its height above the right front stub axle in the process. This in turn leads to different readings on the first and second scales, giving an indication of the caster angle of the right front stub axle. It is possible that the caster angle of the left front stub axle also has an influence on these readings due to the inclination of the separate laser emission tool during the turning of the steering mechanism. Accordingly, the measured angle may be a compound caster angle that depends on both the caster angles of the right front stub axle and the left front stub axles. However, such compound caster angle is also a good indication of the caster angle of the right front stub axle.

According to a further embodiment, the axle engagement structure is adapted to position the go kart steering measurement tool on a rear axle of the go kart, with the target surface facing towards a front of the go kart, such that, upon the separate laser emission tool being positioned on a steerable front stub axle of the go kart and upon the steering mechanism being turned and the impinging laser beam moving across the target surface as a result thereof, the difference between the first measurement and the second measurement is an indication of the king pin angle of the steerable front stub axle, onto which the separate laser emission tool is positioned. In other words, the axle engagement structure has a configuration that allows for the go kart steering measurement tool to be placed onto the rear axle of the go kart, and the axle engagement structure and the target surface have such a relative positioning on the tool body that the positioning of the go kart steering measurement tool on the rear axle of the go kart via the axle engagement structure results in the target surface facing towards the front of the go kart. The target surface is thus able to make an impinging laser beam visible that originates from somewhere in the front of the go kart, in particular from one of the left and right front stub axles, with the king pin angle measurement relying on the same principles as discussed above with respect to the caster angle measurement. In particular, the target surface may be positioned in a plane that is parallel to the rear axle.

In each of the measurement operations, the tool that is placed on a steerable front stub axle inclines during the turning of the front wheel steering mechanism. In particular, the tool inclines in a front/back direction of the go kart as a result of a non-zero caster angle, and the tool inclines in a left/right direction of the go kart as a result of a non-zero king pin angle. This inclination can be made visual either by placing the go kart steering measurement tool, having the target surface, on one steerable front stub axle and positioning the separate laser emission tool on the other steerable front stub axle for emitting a laser beam towards the target surface or by placing the go kart steering measurement tool, having the target surface, on the right (left) side of the rear axle of the go kart and positioning the separate laser emission tool on the right (left) front stub axle of the go kart for emitting a laser beam towards the target surface. The visualisation of the inclination via the laser beam leads to different crossing points of the first and second scales, when the front wheel steering mechanism is turned, which crossing points represent the first and second measurements for measuring the caster angle or the king pin angle.

It is pointed out that it is also possible that the go kart steering measurement tool has two target surfaces. The first target surface may be arranged on the tool body in such a way that, when the axle engagement structure is in engagement with one of the left and right front stub axles, the first target surface faces towards the other one of the left and right front stub axles. The second target surface may be arranged on the tool body in such a way that, when the axle engagement structure is in engagement with the rear axle, the second target surface faces towards the front of the go kart. It is also possible that the go kart steering measurement tool has a target surface that has two pairs of scales, namely a first caster scale and a second caster scale as well as a first king pin angle scale and a second king pin angle scale. It is further possible that the go kart steering measurement tool has a target surface that has a first scale and a second scale, wherein the first and second scales are usable for both caster angle measurements and king pin angle measurements.

The axle engagement structure may have an engagement groove or a tubular channel or any other suitable structure for placing the go kart steering measurement tool onto a front stub axle and/or onto a rear axle. The go kart steering measurement tool may be placed onto an axle from the top via an engagement groove, or may be placed onto an axle by sliding it onto the axle via the tubular channel. It is also possible that the axle engagement structure has two engagement grooves or two tubular channels for achieving different positions with respect to a given axle.

According to a further embodiment, the plurality of first markings are arranged in a linear manner and the plurality of second markings are arranged in a linear manner. In other words, the plurality of first markings form a straight line arrangement and the plurality of second markings form a straight line arrangement. In this context, the arrangement in a linear manner does not mean that the scaling of the first and second scales is linear. It only means that the geometric arrangement of the markings on the target surface results in a linear structure. In this way, the first and second markings may be conveniently placed on the target surface, such as along the left and right edges thereof. It is pointed out that the plurality of first markings and the plurality of second markings do not have to be arranged in a linear manner. It is possible that the plurality of first markings and/or the plurality of second markings have a curved arrangement, e.g. in the form of two tan-function curves converging towards each other at the top or at the bottom of the target surface.

According to a further embodiment, the first scale and the second scale are arranged in parallel. This again helps in placing the first and second scales in convenient positions and making the handling of the go kart steering measurement tool easy. The user may easily take the first and second measurements on the parallel scales as he can see both scales in the same manner from one point of view. Again, it is possible that the first and second scales are not arranged in parallel. They may for example also be arranged in two straight lines that converge towards each other at the top or at the bottom of the target surface.

According to a further embodiment, the first and second scales are spaced apart by a distance of between 2 cm and 20 cm, in particular by a distance of between 3 cm and 8 cm, further in particular by a distance of between 3 cm and 6 cm. Such a spacing has been found to be a good compromise between implementing a compact go kart steering measurement tool and reaching large enough of a difference between the first and second measurements, such that the resulting measurement of the caster angle or the king pin angle is not too sensitive to measurement inaccuracies. While a larger distance between the first and second scales is advantageous for accuracy and/or resolution of the measurements, a smaller distance allows for a more compact go kart steering measurement tool.

According to a further embodiment, the plurality of first markings and the plurality of second markings represent degree values. In this way, the user may directly read the caster angle/king pin angle from the difference in the first and second measurements, again helping in providing a quick and convenient way of measuring the caster angle/king pin angle. It is, however, pointed out that the first and second markings may also represent any other kind of values that can be converted into degree values by the user according to a pre-defined conversion scheme.

According to a further embodiment, the first scale and the second scale each have a linear scaling. In this context, the term linear refers to a constant step-width of the scaling. In other words, the difference between two measurements made on the first end of the scales represents the same angle indication as the same difference between two measurements made on the second end of the scales. With the first and second scales having a linear scaling and their markings representing degree values, the resulting measurement is an approximation of a trigonometric tan-function. While an exact measurement would need to rely on a relation of the difference between the first and second measurements to the spacing of the two scales via the tan-function, it has been found that the linear scaling is a sufficient approximation for common caster angles of between 5° and 20°, in particular for the most common caster angles of between 10° and 15°. The linear scaling may for example be configured in such a way that it leads to accurate results for a caster angle of 10° or 11° or 12° or 13° or 14° or 15°. The term degree and the character ° are used interchangeably herein. The linear scaling has also been found to be a sufficient approximation for common king pin angles. It is pointed out that the first and second scales may also have non-linear scalings. In particular, the first and second scales may have scalings that are based on a tan-function.

According to a further embodiment, the linear scaling is between 0.4 mm/degree and 0.6 mm/degree, in particular about 0.5 mm/degree. It has been found that this value range of the linear scaling allows for easy to read and, thus, quick measurements with sufficient accuracy for a common laser beam width. The exact value of the linear scaling used depends on the spacing of the first and second caster scales, on the assumed distance between the go kart steering measurement tool and the separate laser emission tool, and on whether the go kart steering measurement tool is assumed to be stationary or whether it is placed on a steerable stub axle. In a particular embodiment, the linear scaling of the first and second scales is 0.5 mm/degree, and the first and second scales are spaced apart 37 mm.

According to a further embodiment, the target surface is a planar surface. This again helps in making the first and second measurements easily readable to the user of the go kart steering measurement tool. According to a particular embodiment, the first and second caster scales are arranged on opposite sides of the target surface. In this way, the whole extension of the target surface is made use of for the caster measurement operation, leading to a high accuracy. According to a particular embodiment, the target surface may be arranged on the tool body in such a way, that it has an upright orientation, when the go kart steering measurement tool is placed on a front axle or a rear axle in a vertical orientation.

According to a further embodiment, the tool body has a generally cuboid shape, with one side of the cuboid tool body comprising the target surface. The cuboid tool body is a favourable structure for providing a planar target surface, from which the measurements may be conveniently read. As discussed above, it is also possible that the go kart steering measurement tool may have two target surfaces. They may be arranged on different sides of the cuboid tool body.

According to a further embodiment, the go kart steering measurement tool further comprises a laser emitter disposed within the tool body and adapted to emit a laser beam, such that the go kart steering measurement tool is also usable as the separate laser emission tool. In this way, the go kart steering measurement tool may function both as the source of the measurements, i.e. as the tool emitting the laser beam, and as the sink of the measurements, i.e. as the tool making the impinging laser beam visible on the target surface. When two such go kart steering measurement tools are provided, each of the go kart steering measurement tools may simultaneously function as the source and the sink of measurements in operation. In this way, the caster angle of both front wheels may be determined very quickly in one measurement operation, when the two go kart steering measurement tools are placed on the left and right front stub axles.

Exemplary embodiments of the invention further include a set of a plurality of go kart steering measurement tools, comprising a first go kart steering measurement tool in accordance with any of the embodiments above, and a second go kart steering measurement tool comprising a laser emitter, wherein the second go kart steering measurement tool is operable as said separate laser emission tool, wherein the first go kart steering measurement tool and the second go kart steering measurement tool allow for a measuring of at least one of the caster angle and the king pin angle by emitting a laser beam from the laser emitter of the second go kart steering measurement tool towards the target surface of the first go kart steering measurement tool. In other words, the set comprises a go kart steering measurement tool in accordance with any of the embodiments above and a separate laser emission tool, such that the measuring of the caster angle and/or of the king pin angle of the front wheel steering mechanism of the go kart can be carried out by a user without the help of any other measurement tools.

According to a further embodiment, the first and second go kart steering measurement tools both comprise a laser emitter. Further in particular, the first and second go kart steering measurement tools may be equal in design or may be mirror images of each other, at least with respect to the features discussed above. The first and second go kart steering measurement tools may be identical or mirror images of each other with the exception of production tolerances, labels, etc. When both of the first and second go kart steering measurement tools have a laser emitter, they can both be equally used as source and sink devices for the measurements.

Exemplary embodiments of the invention further include a target device for measuring at least one of a caster angle and a king pin angle of a front wheel steering mechanism of a go kart, the target device comprising a target surface for making an impinging laser beam from a separate laser emission tool visible, wherein the target surface comprises a first scale, comprising a plurality of first markings, and a second scale, comprising a plurality of second markings, with the first scale and the second scale having the same scaling, and wherein the first scale and the second scale are spaced apart, such that, upon the separate laser emission tool being attached to the front wheel steering mechanism and the front wheel steering mechanism being turned and the impinging laser beam moving across the target surface as a result thereof, a first measurement on the first scale and a second measurement on the second scale can be made by visual inspection, with a difference between the first measurement and the second measurement being an indication of the caster angle or of the king pin angle of a steerable stub axle of the go kart. The target device may be a target device for a go kart steering measurement tool. In particular, it may be configured to be attached to a tool body of a go kart steering measurement tool.

According to a particular embodiment, the target device may be in the form of a sheet or a film, in particular a plastic film, or a sticker. The target device may be fixedly held in place on a steerable front stub axle or on a rear axle or on a fixed part of the go kart chassis in any suitable way for carrying out the caster angle/king pin angle measurement. In particular, when the target device is a sticker, it may be adhered to a tool body that allows for fixing the target device in position with respect to the front stub axle/rear axle/chassis part. The adherence may be achieved via the adhesive of the sticker. Before being adhered to the tool body, the adhesive side of the sticker may be covered with release paper(s). When the target device is in the form of a sheet or film, it may be adhered to a tool body via any kind of suitable adhesive or other form of attachment. In general, the target device may be attached to a tool body. The extension of the target surface may substantially correspond to the extension of the target device.

According to a further embodiment, the target device may be configured to be placed onto a fixed part of the go kart chassis, e.g. via a suitable tool body, wherein the fixed part of the go kart chassis may be a fixed part of the go kart chassis in the rear thereof or a fixed part of the go kart chassis in between the two front stub axles. The target device may be oriented towards one of the right and left front stub axles. Upon the separate laser emission tool being attached to one of the right and left front stub axles and the front wheel steering mechanism being turned and the impinging laser beam moving across the target surface as a result thereof, the difference between the first measurement and the second measurement is an indication of the caster angle or the king pin angle, depending where the target device is positioned, of the one of the right and left front stub axles onto which the separate laser emission tool is placed.

The modifications, additional features, and advantages discussed above with respect to the go kart steering measurement tool equally apply to the target device.

According to a further embodiment, the target device further comprises an adhesive, with the adhesive and the target surface being arranged on opposite sides of the target device, wherein the target device is applicable to a tool body of a go kart steering measurement tool via the adhesive with the target surface being visible.

Exemplary embodiments of the invention further include a method of measuring at least one of a caster angle and a king pin angle of a front wheel steering mechanism of a go kart, the method comprising the steps of attaching a go kart measurement tool to a go kart, the go kart measurement tool having a target surface for making an impinging laser beam visible, the target surface comprising a first scale, comprising a plurality of first markings, and a second scale, comprising a plurality of second markings, with the first scale and the second scale having the same scaling and being spaced apart, attaching a separate laser emission tool to the front wheel steering mechanism of the go kart, with the separate laser emission tool emitting a laser beam impinging on the target surface of the go kart measurement tool, moving the impinging laser beam across the target surface by turning the front wheel steering mechanism, and taking a first measurement on the first scale and a second measurement on the second scale, with a difference between the first measurement and the second measurement being an indication of the caster angle or of the king pin angle of a steerable stub axle of the go kart.

According to a further embodiment, the method is a method of measuring the caster angle of the front wheel steering mechanism of the go kart, the step of attaching the go kart measurement tool to the go kart comprises positioning the go kart steering measurement tool on any one of a right steerable front stub axle and a left steerable front stub axle of the go kart, with the target surface facing towards the other one of the right steerable front stub axle and the left steerable front stub axle, the step of attaching the separate laser emission tool to the front wheel steering mechanism of the go kart comprises positioning the separate laser emission tool on the other one of the right steerable front stub axle and the left steerable front stub axle, and the difference between the first measurement and the second measurement is the indication of the caster angle.

According to a further embodiment, the method is a method of measuring the king pin angle of the front wheel steering mechanism of the go kart, the step of attaching the go kart measurement tool to the go kart comprises positioning the go kart steering measurement tool on a rear axle of the go kart, with the target surface facing towards the front of the go kart, the step of attaching the separate laser emission tool to the front wheel steering mechanism of the go kart comprises positioning the separate laser emission tool on a steerable front stub axle of the go kart, and the difference between the first measurement and the second measurement is the indication of the king pin angle.

The modifications, additional features, and advantages discussed above with respect to the go kart steering measurement tool equally apply to the method of measuring at least one of a caster angle and a king pin angle of a front wheel steering mechanism of a go kart.

BRIEF DESCRIPTION OF THE DRAWINGS

Further exemplary embodiments of the invention will be described with respect to the accompanying drawings, wherein.

DETAILED DESCRIPTION OF THE INVENTION

Figure 1:
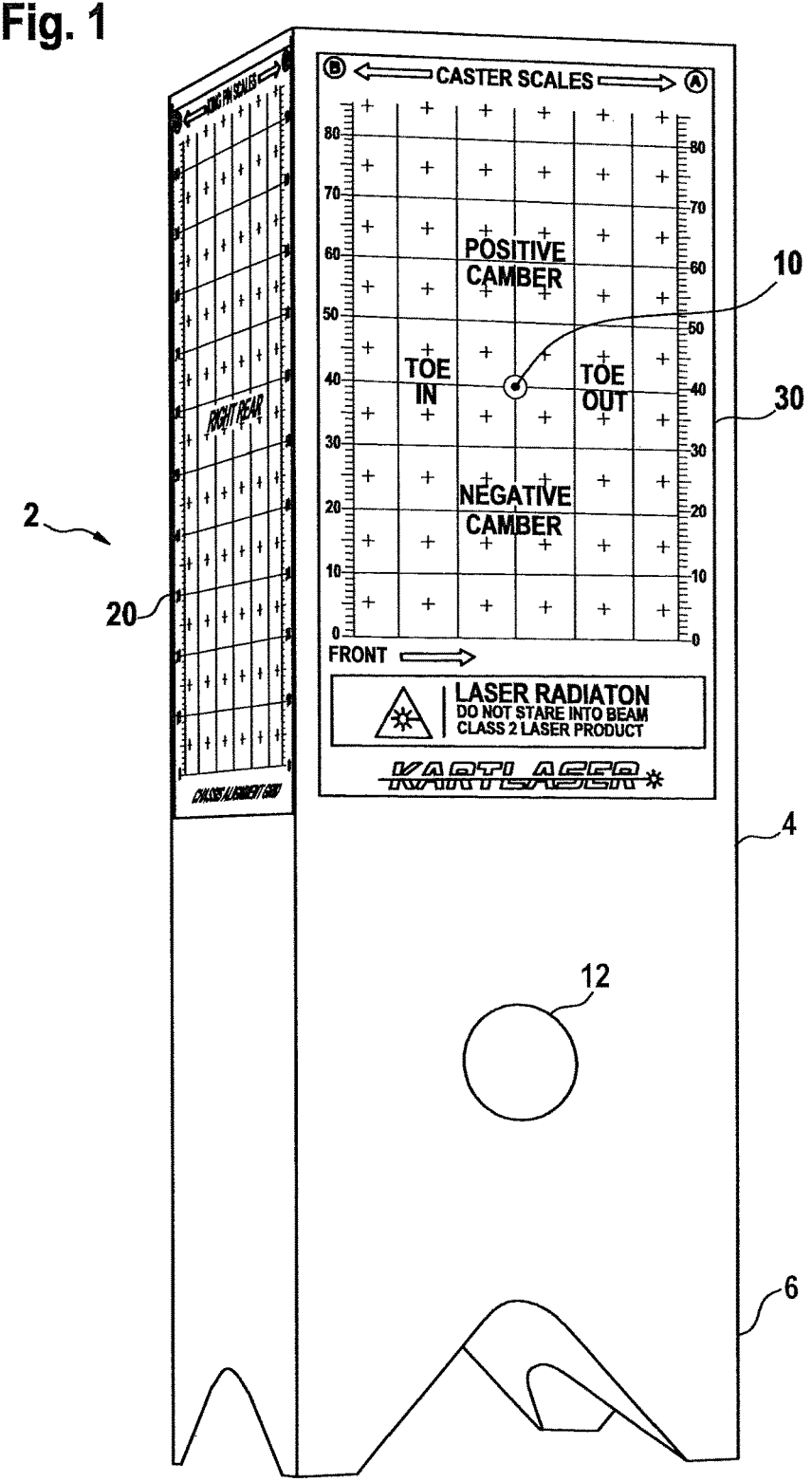
FIG. 1 shows a go kart steering measurement tool in accordance with a first exemplary embodiment of the invention in a perspective view.

FIG. 1 shows a go kart steering measurement tool 2 according to an exemplary embodiment of the invention. The go kart steering measurement tool 2 has a tool body 4 and an axle engagement structure 6. In the present embodiment, the tool body 4 and the axle engagement structure 6 are integrally forming, i.e. they are a one-piece structure, such that the tool body 4 forms the upper portion of this one-piece structure and that the axle engagement structure 6 forms the lower portion of this one-piece structure. It is, however, also possible that the tool body 4 and the axle engagement structure 6 are separate pieces that may be coupled to each other in one or two or more configurations.

The tool body 4 has a substantially cuboid outer shape, wherein the four side faces of the cuboid structure are of equal area. This in turn means that the top surface of the tool body 4 has a square shape. The top-to-bottom extension of the tool body 4 is roughly twice the width of the four side faces. Accordingly, it is fair to say that the tool body 4, and thus the go kart steering measurement tool 2 as a whole, has its longitudinal direction of extension in the vertical direction. With the tool body 4 and the axle engagement structure 6 being a one-piece structure, only the lower portion of this one-piece structure, which provides for the engagement with the axles of a go kart, is referred to as the axle engagement structure 6. The details of the axle engagement structure 6 are described with respect to FIG. 4 below. The remainder of the one-piece structure, i.e. the portion above the axle engagement structure 6, is referred to as the tool body 4.

The go kart steering measurement tool 2 further comprises a first target surface 20 and a second target surface 30. The first target surface 20 and the second target surface 30 are arranged on adjacent sides of the cuboid tool body 4. The first and second target surfaces 20, 30 cover substantially the entire width of the respective side face of the tool body 4. They further are equal in height and both cover approximately 60-70% of the height of the tool body 4 on the respective side faces.

The first target surface 20 has a first grid of markings, covering substantially the entire first target surface 20. The second target surface 30 has a second grid of markings, covering the second target surface substantially entirely in the width-wise direction and covering roughly 70-80% of the second target surface 30 in the height-dimension. The first grid of markings on the first target surface 20 and the second grid of markings on the second target surface 30 and their use during measurements are described in greater detail below. In particular, the first target surface 20 of FIG. 1 corresponds to the first target surface 20 shown in FIG. 5A, and the second target surface of FIG. 1 corresponds to the second target surface 30 shown in FIG. 5C. The first and second target surfaces 20, 30 also comprise respective first and second scales, each comprising a plurality of first/second markings. This will also be described in detail below.

In the exemplary embodiment of FIG. 1, the first target surface 20 is provided in the form of a sticker that is applied to the tool body 4. Analogously, the second target surface 30 is provided in the form of a sticker that is applied to the tool body 4. However, it is also possible that the first and second target surfaces 20, 30 are provided in different ways on the tool body 4. For example, the respective markings may be drawn right onto or machined into the tool body 4. In FIGS. 2 to 4 and 6, the go kart steering measurement tool 2 is shown without the first and second target surfaces 20, 30. However, this is only for a clearer illustration of the tool body 4 and the axle engagement structure 6. The go kart steering measurement tool 2 of FIGS. 2 to 4 and 6 can be thought of as being provided with first and second target surfaces that correspond to the first and second target surfaces 20, 30 of FIGS. 1 and 5.

The go kart steering measurement tool 2 further comprises a laser emitter 10, with the laser emitter 10 emitting a laser beam from a central portion of the second grid of markings of the second target surface 30. Further, the go kart steering measurement tool comprises an on/off switch 12, which is disposed roughly in the middle between the second target surface 30 and the axle engagement structure 6 on the tool body 4.

Figure 2A:
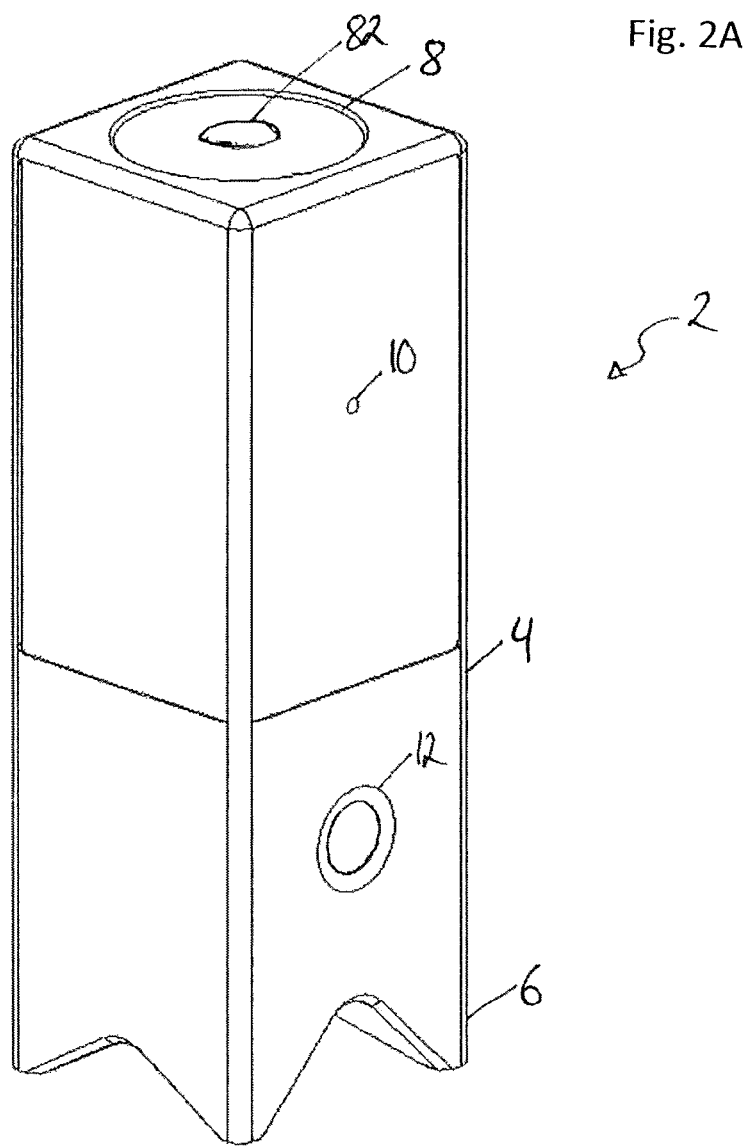
FIG. 2A shows a go kart steering measurement tool in accordance with a second exemplary embodiment of the invention in a perspective view.

FIG. 2A shows a go kart steering measurement tool 2 in accordance with a second exemplary embodiment of the invention. The go kart steering measurement tool 2 of FIG. 2A is very similar to the go kart steering measurement tool 2 of FIG. 1. Like elements are denoted with like reference numerals and will not be described again. Reference is made to above description of these elements.

The go kart steering measurement tool 2 of FIG. 2A is shown in a different perspective view, such that the top face of the tool body 4 is visible in the viewing direction of FIG. 2A. In this way, it can be seen that the go kart steering measurement tool 2 comprises a level 8. The level 8 is a water level, wherein an air bubble 82 indicates via its position within a liquid-filled compartment if the go kart steering measurement tool 2 is oriented vertically. As the water level 8 is round and as the air bubble 82 is free to move around the whole liquid-filled compartment, a two-dimensional vertical alignment of the go kart steering measurement tool can be observed via the level 8. For some of the measurements described below, the go kart steering measurement tool 2 is oriented vertically in both dimensions, while a vertical alignment in one dimension is sufficient for other measurements.

In FIG. 2A, the go kart steering measurement tool 2 is shown without the first target surface 20 and the second target surface 30 in order to provide a better illustration of the tool body 4. However, the positions for the first target surface 20 and the second target surface 30 are shown as slightly recessed as compared to the remainder of the tool body 4. In this way, the tool body 4 reserves the space for and indicates the appropriate positioning of the first and second target surfaces 20, 30.

Figure 2B:
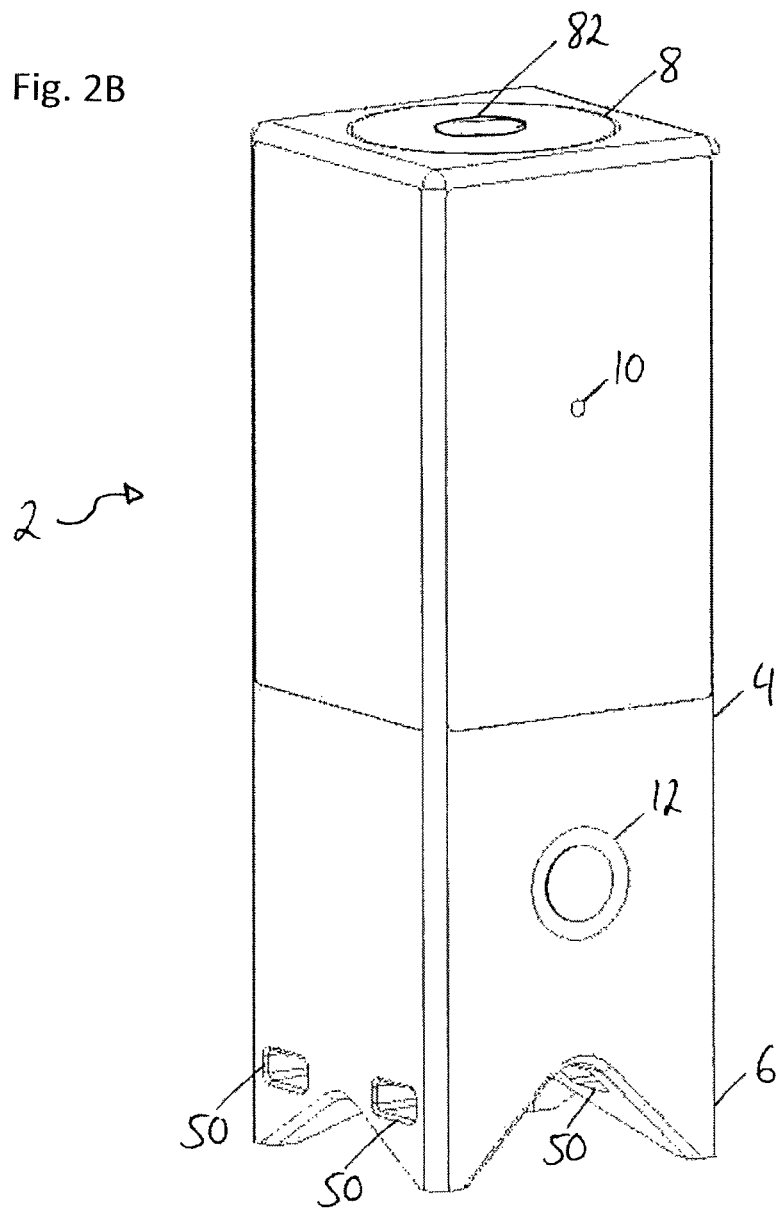
FIG. 2B shows a go kart steering measurement tool in accordance with a third exemplary embodiment of the invention in a perspective view.

FIG. 2B shows a go kart steering measurement tool 2 in accordance with a third exemplary embodiment of the invention. The go kart steering measurement tool 2 of FIG. 2B is identical to the go kart steering measurement tool 2 of FIG. 2A, with one exception. Like elements are denoted with like reference numerals and will not be described again. Reference is made to above description of these elements. The only difference between the go kart steering measurement tool 2 of FIG. 2A and the go kart steering measurement tool of FIG. 2B is the provision of cable tie ducts 50. The cable tie ducts 50 extend through the axle engagement structure between the left and right sides thereof and allow for cable ties or zip ties to be inserted for fastening the go kart steering measurement tool to an axle. In this way, the go kart steering measurement tool 2 may be fastened to a go kart axle as an optional fastening means in addition to the engagement via the axle engagement structure 6, which will be described below.

Figure 3:
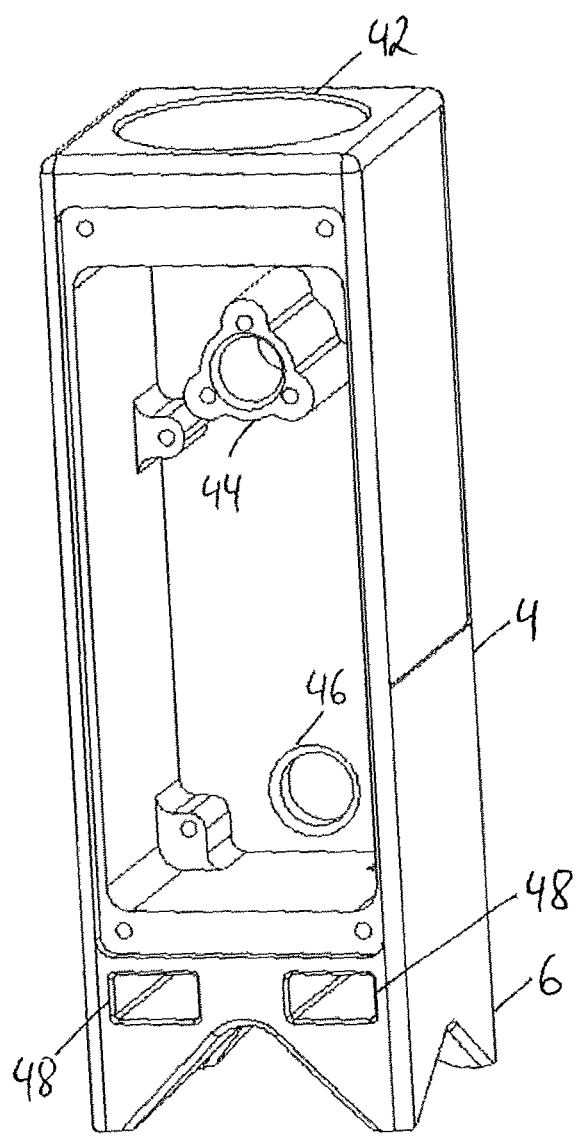
FIG. 3 shows selected components of the go kart steering measurement tool of FIG. 2A in another perspective view.

FIG. 3 shows the integrated one-piece structure of the tool body 4 and the axle engagement structure 6 of the go kart steering measurement tool 2 of FIG. 2A in a different perspective view. In particular, the integrated one-piece structure of the tool body 4 and the axle engagement structure 6 is shown from a perspective top rear view. In FIG. 3, the tool body 4 is shown without a compartment cover, which forms the back face of the substantially cuboid tool body 4 during use. In the absence of this compartment cover, it can be seen that the tool body 4 is substantially hollow. On the inside of the tool body 4, a laser emitter holding structure 44 and an on/off switch holding structure 46 are provided for holding the laser emitter 10 and the on/off switch 12, respectively, in an assembled configuration. Further, the tool body 4 has a level recess 42 on its top face for housing the level 8 in the assembled configuration. In the assembled configuration, the space within the tool body 4 is further used for arranging one or more batteries or other sources of electric energy and appropriate circuit elements that interconnect the on/off switch 12, the laser emitter 10 and the source(s) of electric energy.

The tool body 4 further comprises two magnet compartments 48. These magnet compartments 48 are provided for inserting magnets, which allow for a magnetic engagement between the go kart steering measurement tool 2 and the go kart axle. The magnetic engagement may be provided as an optional engagement mechanism in addition to any of the other engagement means described herein.

Figure 4A:
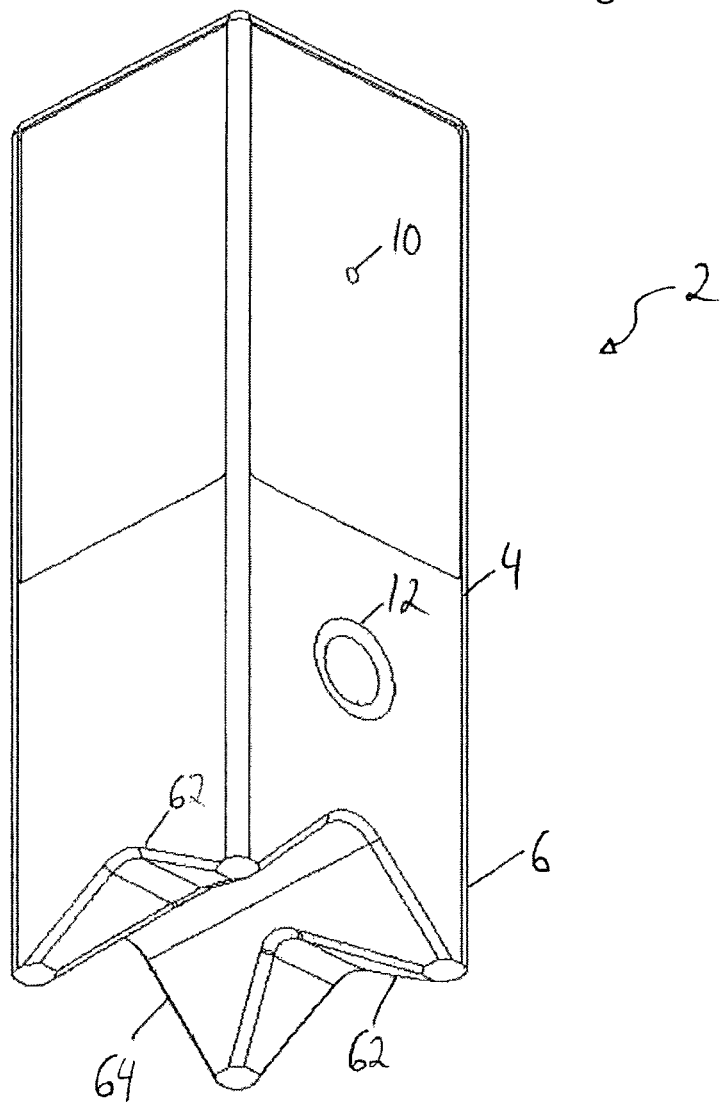
FIG. 4A shows the go kart steering measurement tool of FIG. 2A in yet another perspective view.

FIG. 4A shows the go kart steering measurement tool 2 of FIG. 2A in a different perspective view, namely partially from the bottom. This angle nicely illustrates the design of the axle engagement structure 6. The axle engagement structure 6 comprises a first engagement groove 62 and a second engagement groove 64.

The second engagement groove 64 extends from the front side of the go kart steering measurement tool 2, i.e. from the side comprising the on/off switch 12 and the laser emitter 10, to the opposite back side of the go kart steering measurement tool 2. In other words, the second engagement groove 64 extends in a linear manner from the front to the back of the go kart steering measurement tool 2. Further, the second engagement groove 64 has a V-shape, with the V-shape extending between two corners of the go kart steering measurement tool 2 on the front side and the back side, respectively. The V-shape of the second engagement groove 64 comprises planar side faces that are coupled to each other via a rounded connection surface. In other words, the V-shape is a V-shape with a round interconnection between the two planar side faces. The second engagement groove 64 extends a distance of about 10-15% of the total height of the go kart steering measurement tool 2 from the bottom into the go kart steering measurement tool 2.

The first engagement groove 62 runs between the left and right side faces of the go kart steering measurement tool 2. The first engagement groove also has a V-shape with planar side faces and a rounded connection surface. Further, the V-shape of the first engagement groove 62 extends between the two corners of the left and right side faces, respectively. The first engagement groove 22 extends a distance of about 5-10% of the total height of the go kart steering measurement tool 2 from the bottom into the go kart steering measurement tool 2.

As the first engagement groove 62 has a smaller height extension than the second engagement groove 64 and as the first engagement groove 62, running from the left side to the right side of the go kart steering measurement tool 2, crosses the second engagement groove 64, running from the front to the back of the go kart steering measurement tool 2, the first engagement groove 62 is split into two groove portions by the crossing second engagement groove 64. Due to this split of the first engagement groove 62, the groove portions of the first engagement groove 62 have substantially triangular side faces. It is pointed out that it is also possible that the first and second engagement grooves have the same height extension into the go kart steering measurement tool 2 or that the first engagement groove has a greater height extension than the second engagement groove 64.

The first engagement groove 62 forms a first engagement element, and the second engagement groove 64 forms a second engagement element. The go kart steering measurement tool 2 may be brought into engagement with an axle of the go kart by means of each of the first engagement element and the second engagement element. In other words, the go kart steering measurement tool 2 may be placed onto a go kart axle with the first engagement groove 62 being placed along the longitudinal extension of the go kart axle or with the second engagement groove 64 being placed along the longitudinal extension of the go kart axle.

The example of the go kart steering measurement tool 2 being placed on the right front stub axle of a go kart is described as follows. It is a first option to place the go kart steering measurement tool 2 onto the right front stub axle of the go kart, with the axle being in engagement with the first engagement groove 62 and with the laser emitter 10 pointing backwards. In this way, the tool body 4, the laser emitter 10 and the whole go kart steering measurement tool 2 have a first orientation where the laser emitter 10 is aiming towards the rear of the go kart. With a suitable target being placed at the rear of the go kart, which might be a target in the form of the first target surface 20 of FIG. 1, a measurement regarding the longitudinal chassis alignment of the go kart may be taken. By comparing this measurement to an analogous measurement with respect to the left side of the go kart, a differential analysis may be used for determining the longitudinal chassis alignment and for determining a potential crab and/or bend and/or twist of the chassis. It is also possible to measure the king pin angle of the right front stub axle with such a set-up.

It is a second option to place the go kart steering measurement tool 2 onto the right front stub axle of the go kart, with the second engagement groove 64 being in engagement with the axle and with the laser emitter 10 pointing towards the left. In this way, the tool body 4, the laser emitter 10 and the whole go kart steering measurement tool 2 are placed onto the right front stub axle in a second orientation. With a suitable target, such as the second target surface 30 of FIG. 1, being arranged on the left front stub axle of the go kart, the set up of the steering mechanism of the go kart can be measured. In particular, it is possible to measure the caster angle of the left front stub axle with such a set-up The different depths of the first engagement groove 62 and the second engagement groove 64 have the effect that the laser emitter has different heights above the front stub axle in the first orientation and the second orientation. This may be desirable for evening out height differences between the front axles and the rear axle during the measurement. However, this is an optional feature, and the depths of the first and second engagement grooves 62, 64 may also be the same. It is also possible to adjust the respective targets accordingly or to even out such height differences in other ways. Moreover, it is also possible that no height adjustment may be necessary for the particular go kart to be measured.

Figure 4B:
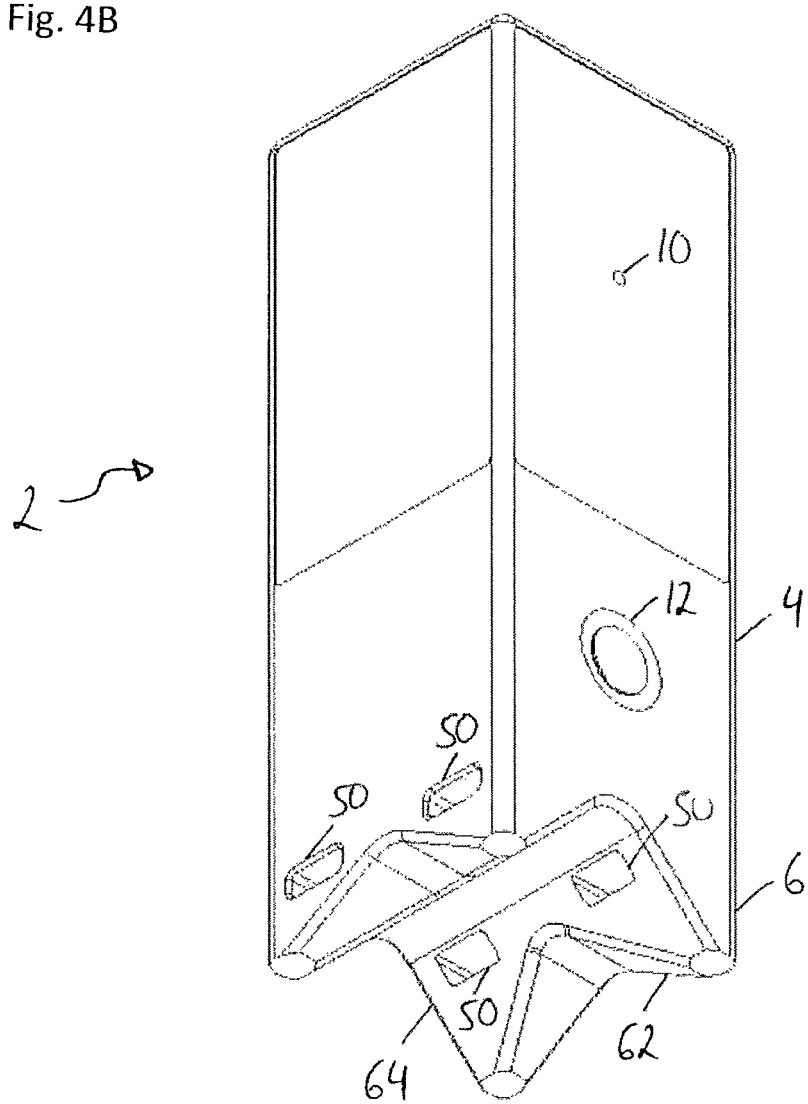
FIG. 4B shows the go kart steering measurement tool of FIG. 2B in yet another perspective view.

FIG. 4b shows the go kart steering measurement tool 2 of FIG. 2b in a perspective view that corresponds to the perspective view of FIG. 4A. Again, the go kart steering measurement tool 2 of FIG. 4b is identical to the go kart steering measurement tool of FIG. 4A, with the exception of the provision of the cable tie ducts 50. There are provided four cable tie ducts 50, with two respective pairs of cable tie ducts 50 establishing a linear connection between the left face and the right face of the axle engagement structure 6.

Figure 6:
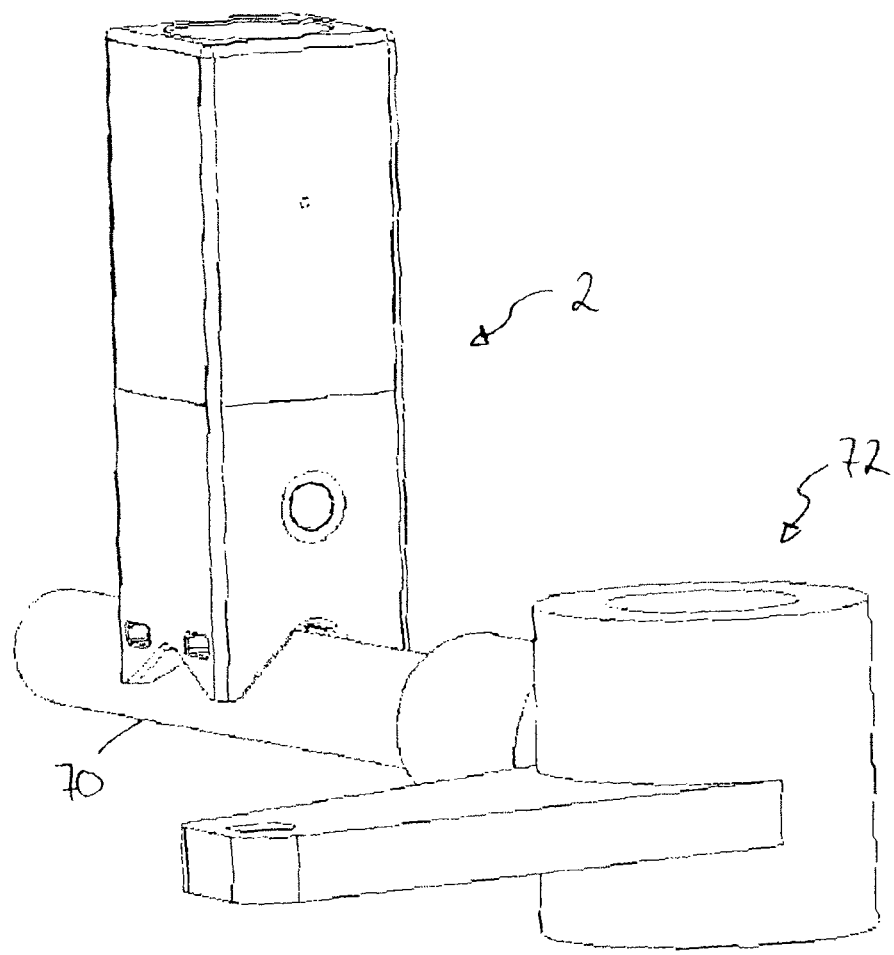
FIG. 6 shows the go kart steering measurement tool of FIG. 2B, placed on a front stub axle.

FIG. 6 shows the go kart steering measurement tool 2 of FIGS. 2b and 4b, placed on a left front stub axle 70 in the second orientation, i.e. with the laser emitter 10 aiming towards the other front stub axle, i.e. aiming towards the right front stub axle. The left front stub axle 70 is coupled to a suspension structure 72, which in turn is mounted to the go kart chassis. It is apparent from FIG. 6 that the go kart steering measurement tool 2 can be lifted up from the left front stub axle 70, can be rotated 90° around its longitudinal axis and can be placed on the left front stub axle 70 with the laser emitter 10 aiming towards the rear of the go kart. This is made possible by the provision of the two engagement grooves in the depicted exemplary embodiment of the go kart steering measurement tool 2.

While the go kart steering measurement tool 2 has been described as having two engagement grooves 62, 64 and a laser emitter 10, it is also possible that the go kart steering measurement tool 2 has another kind of axle engagement structure, e.g. an axle engagement structure with only one engagement groove or with one other engagement element, and that the go kart steering measurement tool 2 has no laser emitter. The go kart steering measurement tool 2 is then still able to make an impinging laser beam from a separate laser emission tool visible and to allow for measurements that indicate the caster angle and/or the king pin angle of a steerable stub axle of the go kart.

Exemplary embodiments of the first target surface 20 and the second target surface 30 are now described with respect to FIG. 5. In FIGS. 5A and 5b, examples of the first target surface 20 are shown. In FIGS. 5C and 5D, examples of the second target surface 30 are shown.

Figure 5B:
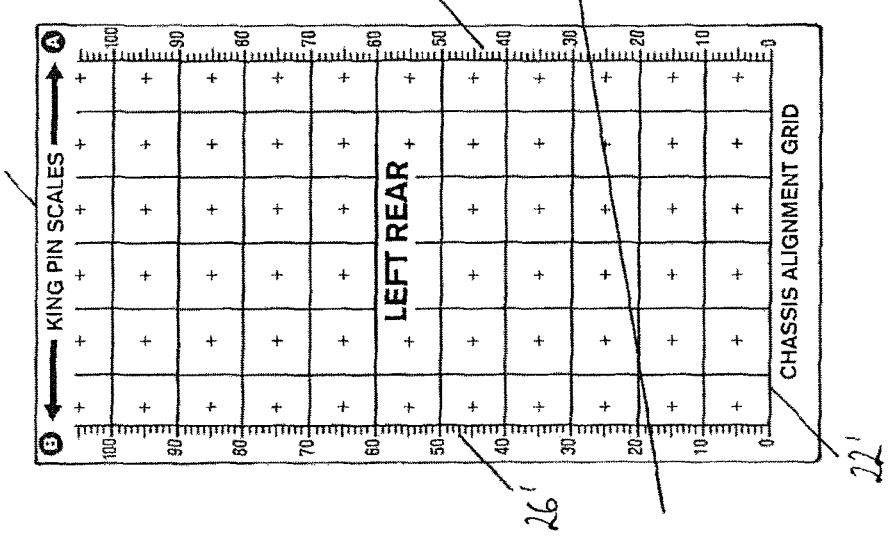
FIGS. 5A-5D show exemplary embodiments of the first and second target surfaces of a go kart steering measurement tool in accordance with exemplary embodiments of the invention.
Figure 5A:
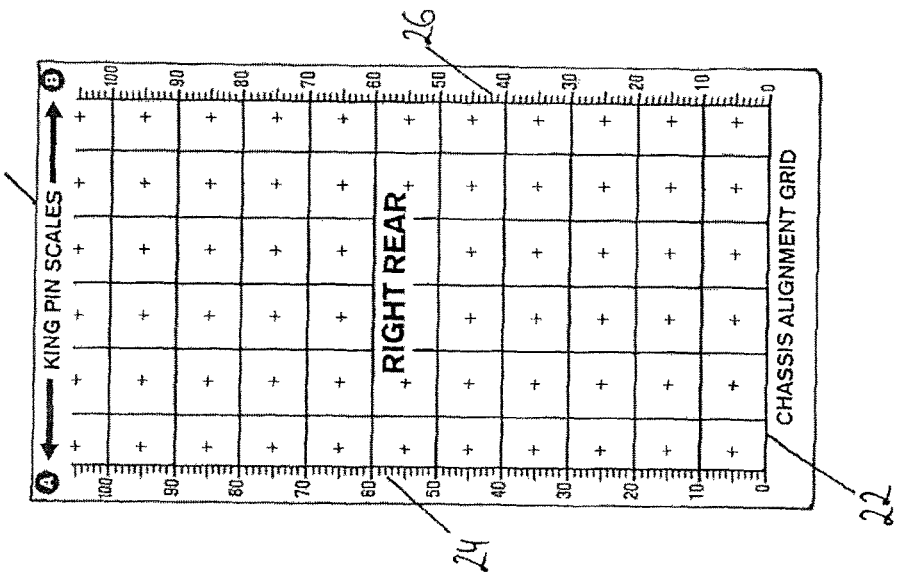

The first target surface 20 of FIG. 5A is generally rectangular, as shown in FIG. 1 as well. The first target surface 20 has a first grid of markings 22, which comprises seven vertical lines and eleven horizontal lines. The first grid of markings 22 covers a very large portion of the first target surface 20. On the left of the first grid of markings 22, a first king pin angle scale 24 is provided. The first king pin angle scale 24 extends almost along the entire height extension of the first target surface 20. It has a linear scale, covering the values from 0 to 105. The values 0 to 105 are indicated by a plurality of first markings, which are a plurality of lines of different lengths in the exemplary embodiment of FIG. 5A. On the right of the first grid of markings 22, an analogous second king pin angle scale 26 is provided. The second king pin angle scale 26 extends almost along the entire height extension of the first target surface 20. It has a linear scale, covering the values from 0 to 105. The values 0 to 105 are indicated by a plurality of second markings, which are a plurality of lines of different lengths in the exemplary embodiment of FIG. 5A. The first target surface 20 further has the indication RIGHT REAR written thereon. This indication tells the user that the first target surface 20 is primarily intended to be placed on the right side of the rear axle of the go kart for the measurements. However, the first target surface 20 may also be placed on the left side of the rear axle as well as on any of the two front stub axles for measurements.

A measurement of the longitudinal chassis alignment is now described with respect to the first target surface 20 of FIG. 5A. For the measurement, a first go kart steering measurement tool, such as the one shown in FIG. 1, is placed onto the right front stub axle of the go kart, with the laser emitter 10 pointing towards the rear of the go kart. Further, a second go kart steering measurement tool, such as the one shown in FIG. 1 and having the first target surface 20 as shown in FIG. 5A, is placed on the rear axle of the go kart, in particular onto a portion of the rear axle on the right side thereof, with the first target surface 20 facing towards the front of the go kart. In this way, the laser beam, emitted by the laser emitter 10, impinges of the first target surface 20. For the measurement, the steering mechanism may be brought into such a configuration that no camber, no toe-in/toe-out and no caster are present. Further, both the first go kart steering measurement tool, placed on the right front stub axle, and the second go kart steering measurement tool, placed on the rear axle, are brought into a fully vertical position with the help of the respective levels. Further, the first go kart steering measurement tool, placed on the right front stub axle, and the second go kart steering measurement tool, placed on the rear axle, are placed in pre-defined positions along the longitudinal extensions of the axles. In this way, the readings can show a deviation from a calibrated expected reading. During the actual measurement, the laser beam impinges on the first target surface 20 at a specific position on the first grid of markings 22. This specific position may be examined by the user of the go kart steering measurement tool 2 and be interpreted as a measure of the longitudinal chassis alignment of the go kart. A horizontal deviation from an expected impingement point may indicate a bend in the chassis, while a vertical deviation from an expected impingement point may indicate a twist of the chassis. The measurement may analogously be carried out between the left front stub axle and the left side of the rear axle.

It is pointed out that the checking of the longitudinal chassis alignment may be made without zeroing the camber and/or the toe in/toe out and/or the caster of the steering mechanism and/or without relying on predefined positions of the go kart steering measurement tool along the longitudinal extensions of the front and rear axles. In particular, the measurement may be made by carrying out both the left measurement between the left front stub axle and the rear axle as well as the right measurement between the right front stub axle and the rear axle. In this case, a differential analysis between the measurements can be made that allows for examining the longitudinal chassis alignment. The measurement influences introduced by the steering mechanism and/or the actual positions of the go kart steering measurement tools along the longitudinal extensions of the axles may cancel out in this differential analysis, such that valid measurements of the longitudinal chassis alignment may still be made.

Another first target surface 20' is shown in FIG. 5b. The first target surface 20' is almost identical to the first target surface 20 of FIG. 5A. The first grid of markings 22' of the first target surface 20' is identical to the first grid of markings 22 of the first target surface 20. The first and second king pin angle scales 24' and 26' are identical to the first and second king pin angle scales 24 and 26, but their positions on the left and the right of the first target surface are interchanged, which can be seen by the interchanged letters A and B on top of the first and second king pin scales. The first target surface 20' is denoted LEFT REAR instead of RIGHT REAR. It is primarily intended to be used on the left side of the rear axle of the go kart, but can also be placed on the right side of the rear axle as well as on any of the two front stub axles for measurements. The king pin angle measurement operation, which is illustrated by line 28, will be described later.

Figure 5D:
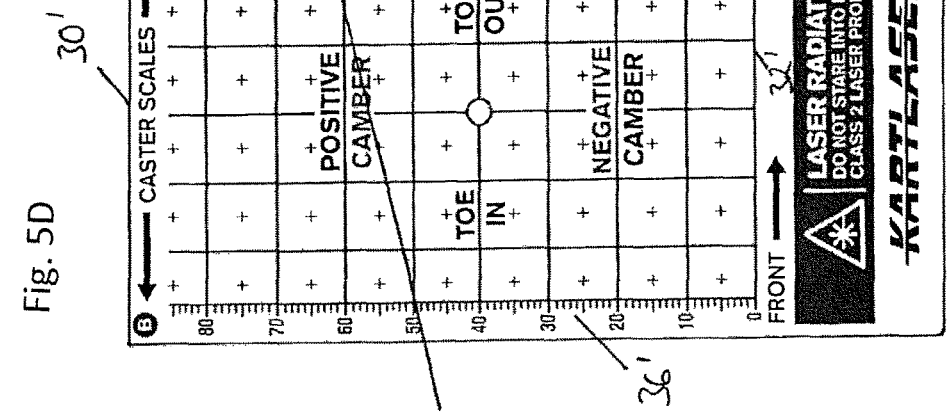
Figure 5C:
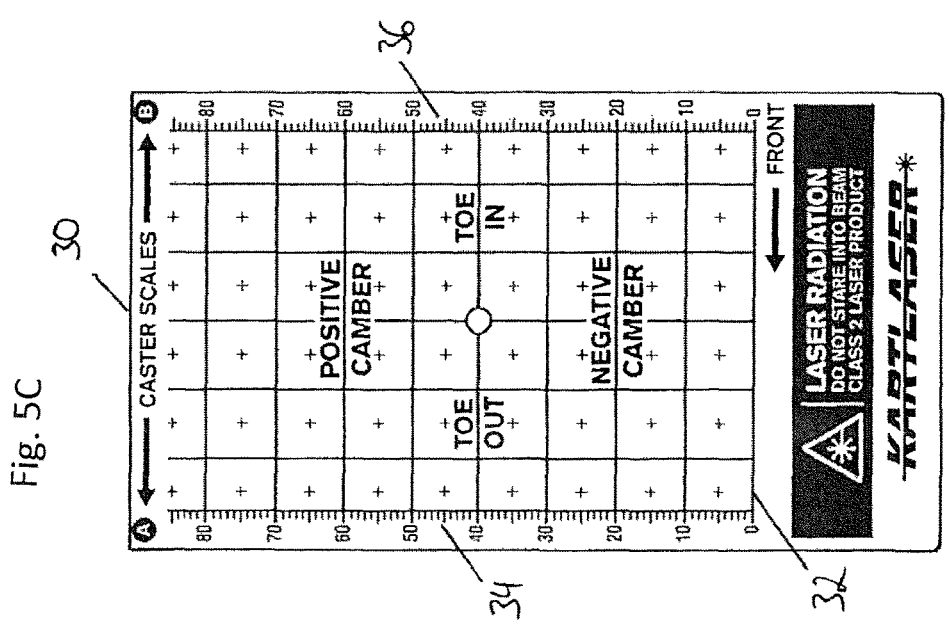

FIG. 5C shows an exemplary embodiment of the second target surface 30, as already shown in FIG. 1. The second target surface 30 has a substantially rectangular shape. It comprises a second grid of markings 32 that substantially covers the upper 75% of the second target surface 30. The second grid of markings 32 has seven vertical lines and nine horizontal lines as well as a center point, with the center point being the location of the laser emitter, as shown in FIG. 1. On the left of the second grid of markings 32, a first caster scale 34 is provided. The first caster scale 34 extends along the entire length of the second grid of markings 32 in the height dimension. It has a linear scale, covering the values from 0 to 85. The values 0 to 85 are indicated by a plurality of first markings, which are a plurality of lines of different lengths in the exemplary embodiment of FIG. 5C. On the right side of the second grid of markings 32, an analogous second caster scale 36 is provided. It extends substantially along the entire height of the second grid of markings 32. It has a linear scale, covering the values from 0 to 85. The values 0 to 85 are indicated by a plurality of second markings, which are a plurality of lines of different lengths in the exemplary embodiment of FIG. 5C. The second target surface 30 further comprises an arrow and an indication FRONT. This indication and the arrow show that the second target surface 30 is primarily intended to be used on the right front stub axle. It is, however, also possible that the second target surface 30 is placed on the left front stub axle for measurements. The second target surface 30 further comprises the indications POSITIVE CAMBER, provided in the upper half of the second grid of markings 32, NEGATIVE CAMBER, provided in the lower half of the second grid of markings 32, TOE OUT, provided in the left half of the second grid of markings 32, and TOE IN, provided in the right half of the second grid of markings 32. These indications make the use of the go kart steering measurement tool more convenient for the user, as they help in interpreting the measurement readings.

An exemplary measurement of the camber and the toe in/toe out parameters of the steering mechanism is described with respect to FIG. 5C. A first go kart steering measurement tool, such as the one shown in FIG. 1, is placed onto the right front stub axle of the go kart, with the laser emitter 10 pointing towards the left front wheel of the go kart. Analogously, a second go kart steering measurement tool, such as the one shown in FIG. 1, is placed on the left front stub axle of the go kart, with the laser emitter 10 pointing towards the right front wheel of the go kart.

As the steering mechanism may have a positive or negative camber, the two go kart steering measurement tools may be inclined with respect to an imaginary center line between the two axles. In other words, due to the camber of the steering mechanism, the two go kart steering measurement tools may be inclined with respect to a transverse direction of the go kart, i.e. they may be placed with the upper portion of the go kart steering measurement tools being inclined towards the right or left with respect to the lower portions. However, the level is used to vertically align the go kart steering measurement tools in the front/rear direction of the go kart. In other words, when placed on the respective front stub axle with the V-groove being in elongated engagement with the respective front stub axle, the go kart steering measurement tool in question is aligned in such a way that it extends straight up from the respective front stub axle and that it is not rotated downwards around the respective front stub axle. This alignment is referred to as a vertical alignment of the go kart steering measurement tool in one dimension. In addition, the steering mechanism is brought into a straight position, i.e. the steering mechanism is not turned towards the right or left for the measurement.

With this set up, the laser beam of the laser emitter 10 of the first go kart steering measurement tool impinges on the second target surface 30 of the second go kart steering measurement tool, while the laser beam of the laser emitter 10 of the second go kart steering measurement tool impinges on the second target surface 30 of the first go kart steering measurement tool. The impingement point of the laser beam, stemming from the first go kart steering measurement tool, placed on the right front stub axle, on the target surface 30 of the second go kart steering measurement tool, placed on the left front stub axle, indicates the camber and the toe in or toe out of the right front wheel, i.e. of the right portion of the front steering mechanism. Analogously, the impingement point of the laser beam, stemming from the second go kart steering measurement tool, placed on the left front axle, and impinging of the second target surface 30 of the first go kart steering measurement tool, placed on the right front axle, indicates the camber and the toe in or toe out of the left front wheel, i.e. of the left portion of the steering mechanism. In other words, the camber and toe in/toe out parameters of one of the front stub axles can be made visual on a target surface attached to the other one of the two front stub axles.

Another second target surface 30' is shown in FIG. 5D. The second target surface 30' is almost identical to the first target surface 30 of FIG. 5C. The second grid of markings 32' of the second target surface 30' is identical to the second grid of markings 32 of the first target surface 30. The first and second caster scales 34' and 36' are identical to the first and second caster scales 34 and 36, but their positions on the left and the right of the second target surface are interchanged. The indication FRONT is provided with an arrow pointing into the opposite direction, as compared to FIG. 5C. In this way, it is indicated that the second target surface 30' is primarily intended to be used on the left front stub axle. However, it is possible to use the second target surface 30' on the right front stub axle as well.

An exemplary caster angle measurement is now described with respect to FIG. 5D. In addition to the elements discussed above, FIG. 5D depicts a line 38, which line 38 illustrates the travelling of an impinging laser beam during a caster scale measurement, the details of which will be described below.

The set up for the caster angle measurement is the same set up as for the camber and toe in/toe out measurement, described with respect to FIG. 5C. After the camber and toe in/toe out measurement, the locking of the steering mechanism in its straight position is released. After being unlocked, the steering wheel is turned from left to right or from right to left. This turning of the steering mechanism results in the laser beam from the go kart steering measurement tool, placed on the left front stub axle, travelling across the second target surface 30 of the go kart steering measurement tool, placed on the right front stub axle. Analogously, the turning of the steering mechanism results in the laser beam from the first go kart steering measurement tool, placed on the right front stub axle, travelling across the second target surface 30 of the first go kart steering measurement tool, placed on the left front stub axle.

FIG. 5D illustrates the travelling of the impinging laser beam across the exemplary second target surface 30' for an exemplary caster angle measurement via the line 38. The line 38 crosses the first caster scale 34' at value 63 and crosses the second caster scale 36' at value 50. Those two values can be observed by the user of the go kart steering measurement tool during the caster angle measurement. Further, by calculating the difference between these values, which amounts to 13, the user obtains an indication of the caster angle of the front stub axle, to which the go kart steering measurement tool is attached. In other words, when observing the impinging laser beam on a particular go kart steering measurement tool, attached to a particular front stub axle, the user is able to deduce an indication of the caster angle of exactly that front stub axle.

In the exemplary embodiment of FIG. 5D, the first caster scale 34' and the second caster scale 36' have such a scaling that the difference between the two measured values directly corresponds to the caster angle of the stub axle in question. In the present example, the caster scale of the measured stub axle is 13°.

It is pointed out that the linear scaling of the first caster scale 34' and the second caster scale 36' is an approximation of the actual angular values. The actual values can be calculated via a tan-function. However, as common caster angles are fairly small, usually between 5° and 20°, in particular between 10° and 15°, and as the tan-function may be approximated well for small angles, the linear scaling provides sufficient accuracy for reaching a caster angle measurement that is sufficient for setting up the go kart steering mechanism.

It is further pointed out that the camber and toe in/toe out also have a slight influence on the caster angle measurement. For this reason, the caster angle measurement methodology, described with respect to FIG. 5D, yields a so-called compound caster measurement. However, as this is the measure commonly used for setting up the go kart and as this value is a fairly good measure for the driving characteristics, these slight influences and the measuring of the compound caster angle are acceptable.

Turning back to FIG. 5b, the measurement of the king pin angle is now described. The principle of the king pin angle measurement is the same as the principle of the caster angle measurement described above with respect to FIG. 5D. In an exemplary king pin angle measurement, the first target surface 20' of FIG. 5D, e.g. as part of a go kart steering measurement tool, is placed on the rear axle of the go kart, in particular onto a portion on the left side of the rear axle of the go kart. A go kart steering measurement tool, such as the one shown in FIG. 1, is placed on the left front stub axle, with the laser emitter emitting a laser beam towards the rear of the go kart. The steering of the go kart is then turned from left to right or from right to left. As a result of this steering operation, the laser beam travels across the first target surface 20', depicted in FIG. 5b. The travelling of the laser beam is illustrated by line 28. Due to the king pin angle of the left king pin of the steering mechanism of the go kart, the line 28 is not horizontal. In the depicted example, the laser beam crosses the first king pin angle scale 24' at a value of 28 and crosses the second king pin angle scale 26' at a value of 18. The difference between the two values, i.e. the value of 10, is an indication of the king pin angle of the left king pin. In the exemplary embodiment of FIG. 5b, the difference represents the king pin angle in degrees, i.e. the king pin angle measured on the basis of the exemplary reading is 10°. Again, the linear scaling of the first and second king pin angle scales 24', 26' is an approximation and exemplary in nature. It is also possible to provide other scalings.

The interchanging of the first and second king pin angle scales between the first target surface 20, depicted in FIG. 5A and intended for use on the right side of the rear axle of the go kart, and the first target surface 20', depicted in FIG. 5b and intended for use on the left side of the rear axle of the go kart, is for convenience of use. With this interchanging, the user may calculate the king pin angle in the same manner by subtracting the value measured at the "B" scale from the value measured at the "A" scale and yields positive/negative difference values for king pin inclinations towards the inside/outside of the go kart in the same manner for both sides. However, it is also possible to use on type of first target surface on both sides, as the scaling of and the distance between the first and second king pin scales is the same.

A set of two go kart steering measurement tools in accordance with above described embodiments allows for very convenient checking of the longitudinal chassis alignment and gauging of the steering mechanism of the go kart. For example, a first go kart steering measurement tool 2, such as the one depicted in FIG. 2A, may be equipped with the first target surface 20 of FIG. 5A, e.g. in the form of a sticker, and with the second target surface 30' of FIG. 5D, e.g. also in the form of a sticker. This first go kart steering measurement tool may conveniently be used on the right side of the rear axle and on the left front stub axle, with all the given labelling helping the user during the measurements. Further, a second go kart steering measurement tool 2, such as the one depicted in FIG. 2A, may be equipped with the first target surface 20' of FIG. 5b, e.g. in the form of a sticker, and with the second target surface 30 of FIG. 5C, e.g. also in the form of a sticker. This second go kart steering measurement tool may conveniently be used on the left side of the rear axle and on the right front stub axle, with all the given labelling helping the user during the measurements. In this way, the first and second go kart steering measurement tools may be used as pairs, with the two being placed on the two front stub axles or with one being placed on a front axle and the other being placed on a corresponding side of the rear axle, and all the measurements described above may be carried out with the two go kart steering measurement tools only.

It is pointed out that the first and second target surfaces may also be provided without the first grid of markings and the second grid of markings, respectively. In other words, it is possible that they are provided with respective first and second scales only. In this way, the first and second target surfaces may be suitable for caster and/or king pin angle measurements only.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A go kart steering measurement tool for measuring a caster angle of a front wheel steering mechanism of a go kart, comprising:
   a tool body; and
   an axle engagement structure adapted to position the go kart steering measurement tool on an axle of the go kart, wherein the tool body has a target surface for making an impinging laser beam from a separate laser emission tool visible to a user of the go kart steering measurement tool, wherein the target surface comprises a first scale, comprising a plurality of first markings, and a second scale, comprising a plurality of second markings, with the first scale and the second scale having the same scaling, and wherein the first scale and the second scale are spaced apart, such that, upon the separate laser emission tool being attached to the front wheel steering mechanism and the front wheel steering mechanism being turned and the impinging laser beam moving across the target surface as a result thereof, a first measurement on the first scale and a second measurement on the second scale can be made by visual inspection, with a difference between the first measurement and the second measurement being an indication of the caster angle of a steerable stub axle of the go kart;

wherein the axle engagement structure is adapted to position the go kart steering measurement tool on any one of a right steerable front stub axle and a left steerable front stub axle of the go kart, with the target surface facing towards the other one of the right steerable front stub axle and the left steerable front stub axle of the go kart, such that, upon the separate laser emission tool being positioned on the other one of the right steerable front stub axle and the left steerable front stub axle of the go kart and upon the steering mechanism being turned and the impinging laser beam moving across the target surface as a result thereof, the difference between the first measurement and the second measurement is an indication of the caster angle of the one of the right steerable front stub axle and the left steerable front stub axle, onto which the go kart steering measurement tool is positioned.

2. The go kart steering measurement tool according to claim 1, wherein the first scale and the second scale are arranged in parallel.

3. The go kart steering measurement tool according to claim 1, wherein the first scale and the second scale are arranged along a tan-function curve.

4. The go kart steering measurement tool according to claim 1, wherein the first scale and the second scale are spaced apart by a distance of between 3 cm and 8 cm, and/or wherein the plurality of first markings and the plurality of second markings represent degree values.

5. The go kart steering measurement tool according to claim 1, wherein the first scale and the second scale each have a linear scaling.

6. The go kart steering measurement tool according to claim 1, wherein the tool body has a generally cuboid shape, with one side of the cuboid tool body comprising the target surface.

7. The go kart steering measurement tool according to claim 1, further comprising a laser emitter disposed within the tool body and adapted to emit a laser beam, such that the go kart steering measurement tool is also usable as the separate laser emission tool.

8. A set of a plurality of go kart steering measurement tools, comprising:
a first go kart steering measurement tool as recited in claim 7; and
a second go kart steering measurement tool as recited in claim 7,
wherein the first go kart steering measurement tool and the second go kart steering measurement tool allow for a measuring of the caster angle by emitting a laser beam from the laser emitter of the second go kart steering measurement tool towards the target surface of the first go kart steering measurement tool.

9. The go kart steering measurement tool according to claim 1, further configured for measuring a king pin angle of the front wheel steering mechanism of the go kart,
wherein the tool body has a second target surface, comprising a third scale, comprising a plurality of third markings, and a fourth scale, comprising a plurality of fourth markings, with the third scale and the fourth scale having the same scaling and being spaced apart, and
wherein the axle engagement structure is adapted to position the go kart steering measurement tool on a rear axle of the go kart, with the target surface facing towards a front of the go kart, such that, upon the separate laser emission tool being positioned on one of the right steerable front stub axle and the left steerable front stub axle of the go kart and upon the steering mechanism being turned and the impinging laser beam moving across the second target surface as a result thereof, a third measurement on the third scale and a fourth measurement on the fourth scale can be made by visual inspection, with a difference between the third measurement and the fourth measurement being an indication of the king pin angle of said one of the right steerable front stub axle and the left steerable front stub axle of the go kart, onto which the separate laser emission tool is positioned.

10. A method of measuring at least one of a caster angle and a king pin angle of a front wheel steering mechanism of a go kart, the method comprising the steps of:
attaching a go kart measurement tool to a go kart, the go kart measurement tool having a target surface for making an impinging laser beam visible, the target surface comprising a first scale, comprising a plurality of first markings, and a second scale, comprising a plurality of second markings, with the first scale and the second scale having the same scaling and being spaced apart;
attaching a separate laser emission tool to the front wheel steering mechanism of the go kart, with the separate laser emission tool emitting a laser beam impinging on the target surface of the go kart measurement tool;
moving the impinging laser beam across the target surface by turning the front wheel steering mechanism; and
taking a first measurement on the first scale and a second measurement on the second scale, with a difference between the first measurement and the second measurement being an indication of the caster angle or of the king pin angle of a steerable stub axle of the go kart.

11. The method according to claim 10,
wherein the method is a method of measuring the caster angle of the front wheel steering mechanism of the go kart,
wherein the step of attaching the go kart measurement tool to the go kart comprises positioning the go kart steering measurement tool on any one of a right steerable front stub axle and a left steerable front stub axle of the go kart, with the target surface facing towards the other one of the right steerable front stub axle and the left steerable front stub axle,
wherein the step of attaching the separate laser emission tool to the front wheel steering mechanism of the go kart comprises positioning the separate laser emission tool on the other one of the right steerable front stub axle and the left steerable front stub axle, and wherein the difference between the first measurement and the second measurement is the indication of the caster angle.

12. The method according to claim 10, wherein the method is a method of measuring the king pin angle of the front wheel steering mechanism of the go kart, wherein the step of attaching the go kart measurement tool to the go kart comprises positioning the go kart steering measurement tool on a rear axle of the go kart, with the target surface facing towards the front of the go kart, wherein the step of attaching the separate laser emission tool to the front wheel steering mechanism of the go kart comprises positioning the separate laser emission tool on a steerable front stub axle of the go kart, and wherein the difference between the first measurement and the second measurement is the indication of the king pin angle.

13. A go kart steering measurement tool for measuring a king pin angle of a front wheel steering mechanism of a go kart, comprising:

a tool body, and an axle engagement structure adapted to position the go kart steering measurement tool on an axle of the go kart, wherein the tool body has a target surface for making an impinging laser beam from a separate laser emission tool visible to a user of the go kart steering measurement tool, wherein the target surface comprises a first scale, comprising a plurality of first markings, and a second scale, comprising a plurality of second markings, with the first scale and the second scale having the same scaling, and wherein the first scale and the second scale are spaced apart, such that, upon the separate laser emission tool being attached to the front wheel steering mechanism and the front wheel steering mechanism being turned and the impinging laser beam moving across the target surface as a result thereof, a first measurement on the first scale and a second measurement on the second scale can be made by visual inspection, with a difference between the first measurement and the second measurement being an indication of the king pin angle of a steerable stub axle of the go kart, wherein the axle engagement structure is adapted to position the go kart steering measurement tool on a rear axle of the go kart, with the target surface facing towards a front of the go kart, such that, upon the separate laser emission tool being positioned on a steerable front stub axle of the go kart and upon the steering mechanism being turned and the impinging laser beam moving across the target surface as a result thereof, the difference between the first measurement and the second measurement is an indication of the king pin angle of the steerable front stub axle, onto which the separate laser emission tool is positioned.

14. The go kart steering measurement tool according to claim 13, wherein the first scale and the second scale are arranged in parallel.

15. The go kart steering measurement tool according to claim 13, wherein the first scale and the second scale are arranged along a tan-function curve.

16. The go kart steering measurement tool according to claim 13, wherein the first scale and the second scale are spaced apart by a distance of between 3 cm and 8 cm, and/or wherein the plurality of first markings and the plurality of second markings represent degree values.

17. The go kart steering measurement tool according to claim 13, wherein the first scale and the second scale each have a linear scaling.

18. The go kart steering measurement tool according to claim 13, wherein the tool body has a generally cuboid shape, with one side of the cuboid tool body comprising the target surface.

19. The go kart steering measurement tool according to claim 13, further comprising a laser emitter disposed within the tool body and adapted to emit a laser beam, such that the go kart steering measurement tool is also usable as the separate laser emission tool.

20. A set of a plurality of go kart steering measurement tools, comprising:

a first go kart steering measurement tool in accordance with claim 19, and a second go kart steering measurement tool in accordance with claim 19, wherein the first go kart steering measurement tool and the second go kart steering measurement tool allow for a measuring of the king pin angle by emitting a laser beam from the laser emitter of the second go kart steering measurement tool towards the target surface of the first go kart steering measurement tool.

21. The go kart steering measurement tool according to claim 13, further configured for measuring a caster angle of the front wheel steering mechanism of the go kart, wherein the tool body has a second target surface, comprising a third scale, comprising a plurality of third markings, and a fourth scale, comprising a plurality of fourth markings, with the third scale and the fourth scale having the same scaling and being spaced apart, and wherein the axle engagement structure is adapted to position the go kart steering measurement tool on any one of a right steerable front stub axle and a left steerable front stub axle of the go kart, with the second target surface facing towards the other one of the right steerable front stub axle and the left steerable front stub axle of the go kart, such that, upon the separate laser emission tool being positioned on the other one of the right steerable front stub axle and the left steerable front stub axle of the go kart and upon the steering mechanism being turned and the impinging laser beam moving across the second target surface as a result thereof, a third measurement on the third scale and a fourth measurement on the fourth scale can be made by visual inspection, with a difference between the third measurement and the fourth measurement being an indication of the caster angle of the one of the right steerable front stub axle and the left steerable front stub axle, onto which the go kart steering measurement tool is positioned.

* * * * *